United States Patent [19]

Turpening

[11] Patent Number: 5,360,951
[45] Date of Patent: Nov. 1, 1994

[54] EARTH REACTION SEISMIC SOURCE

[76] Inventor: Walter R. Turpening, 11606 Brooks Meadows, Meadows, Tex. 77477

[21] Appl. No.: 135,806

[22] Filed: Oct. 13, 1993

[51] Int. Cl.⁵ .............................................. G01V 1/02
[52] U.S. Cl. .................................. 181/113; 181/401; 367/189
[58] Field of Search ............... 181/106, 108, 113, 400, 181/114, 121, 401; 367/189

[56] References Cited

U.S. PATENT DOCUMENTS

| | | | |
|---|---|---|---|
| 3,282,371 | 11/1966 | Miller | 181/106 |
| 3,346,066 | 10/1967 | Miller | 181/106 |
| 3,504,756 | 4/1970 | Bodine | 181/106 |
| 4,850,449 | 7/1989 | Cheung | 181/101 |
| 5,115,880 | 5/1992 | Sallas et al. | 181/106 |

Primary Examiner—J. Woodrow Eldred
Attorney, Agent, or Firm—Pravel, Hewitt, Kimball & Krieger

[57] ABSTRACT

A source for emission of seismic energy waves into subsurface earth formations is provided with electrically energizable signal generators mounted between two plate members. One of the plate members is anchored to the earth surface and the other rests on and is coupled with the earth surface. The source is easily movable between shotpoint locations and provides controllable seismic signals of improved bandwidth and quality.

20 Claims, 1 Drawing Sheet

EARTH REACTION SEISMIC SOURCE

FIELD OF THE INVENTION

The present invention relates to sources for imparting seismic energy into earth surfaces.

BACKGROUND OF THE INVENTION

Seismic sources used in land geophysical exploration of subsurface formations have, so far as is known, been of two general types. The first type has been explosives which were usually detonated in shot holes during seismic surveys. In addition to the hazards present in dealing with explosive substances, there were several other problems. One was the inability to repeat successive shots from the same shot point. Another was the inability to control the amplitude and frequency content of the signal generated on explosion.

A second type of seismic source involved the use of counter-rotating or reciprocating weight masses. When the weight masses were mechanically caused to move, the weight and size needed in the systems to impart adequate energy caused a problem. The requisite bulk rendered the systems quite heavy, cumbersome and difficult to move or transport. Additionally, there were practical limits on the bandwidth of the seismic signal which could be formed. These relatively large bodies could not be induced to move or rotate beyond certain speeds or frequencies. When the weight masses were caused to move by hydraulic or pneumatic fluids, the foregoing problems were still present. An additional problem that arose was that of the heat induced in the fluids, which then had to be dissipated.

SUMMARY OF THE INVENTION

Briefly, the present invention provides a new and improved seismic source which uses the earth as a reaction body to the seismic energy imparted into it. An earth reaction seismic source according to the present invention imparts seismic energy into earth formations using as a reaction mass the earth portion to which it is mechanically coupled. The seismic energy source according to the present invention includes a first plate member adapted to rest on an earthen surface. A piezoelectric transducer or transducers are mounted on the first plate member to convert electrical energy into mechanical vibrating energy. A second plate member rests above the piezoelectric transducers and is anchored to the earth by an earth clamping mechanism. When the transducer receives electrical energy, mechanical vibratory motion is imparted into the earth through the first plate member.

The earth serves as a reaction mass to this vibratory energy because the earth clamping mechanism anchors the second plate member and consequently the transducer and first plate member to the earth. The piezoelectric transducers respond to electric energy which can be controlled in both frequency bandwidth and amplitude based on particular survey requirements. The piezoelectric transducers also allow a reference energy level of vibratory energy to be set as a reference load point.

DETAILED DESCRIPTION OF PREFERRED EMBODIMENT

Figure 3:
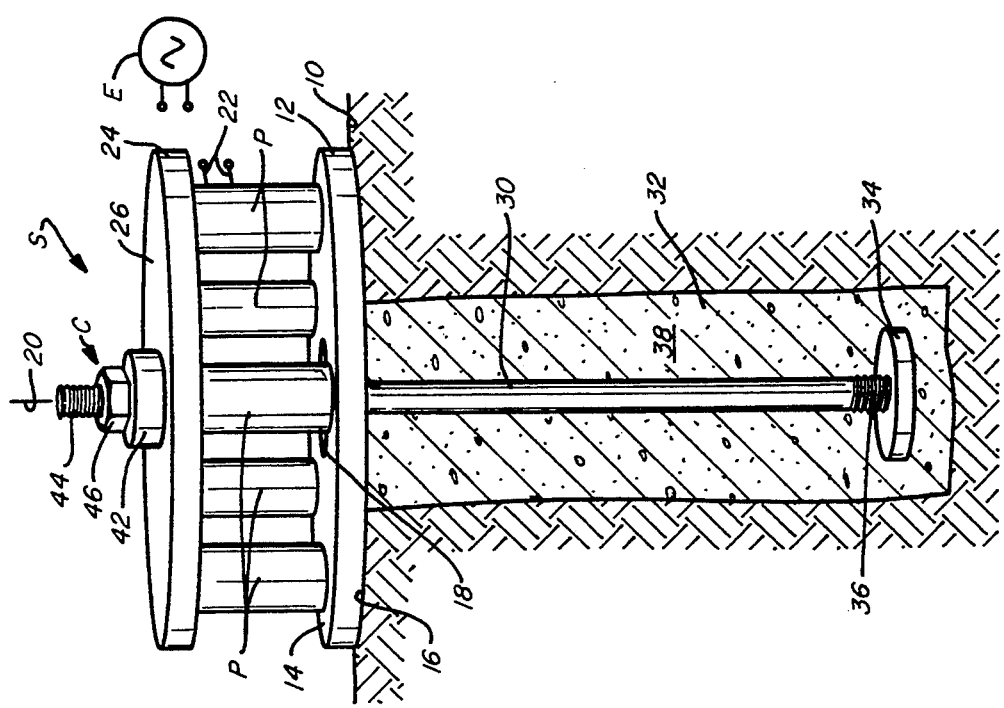
FIG. 3 is an isometric view of an alternate earth clamping mechanism for a seismic source which can be used with the seismic sources of FIGS. 1 and 2.

In the drawings, the letter S designates generally a new and improved seismic source according to the present invention. The seismic source S is used to impart vibratory mechanical seismic energy into earth formations beneath an earthen surface 10. As will be set forth, the seismic source S uses the earth as a reaction body to the seismic energy imparted into it. The earth in effect serves as a reaction mass because of its mechanical coupling to the seismic source S.

The seismic source S of the present invention includes a first or lower plate member 12 adapted to rest on the earthen surface 10. The plate member 12 is typically a generally circular plate member formed of aluminum or other suitable material. For strength purposes, the plate member 12 is usually one inch or so thick or larger. If desired, reinforcing or stiffener ribs may be formed at suitable locations on an upper surface 14 or a lower surface 16 of the plate member 12. The first plate member 12 has an opening or passage 18 formed through it in a central portion about a central, vertically extending longitudinal axis 20.

A suitable number of transducers P are mounted on the upper surface 14 of the first plate member 12. The transducers P are preferably mounted symmetrically on the first plate member 12 about the longitudinal central axis 20. The size or surface area of the plate member 12 is dependent upon the number of transducers P mounted on it. The number of such transducers is determined on the particular survey needs, such as the signal amplitude, total amount of energy imparted and other geophysical survey factors.

The transducers P may be any of several suitable types which respond to the application of electrical energy at input terminals 22. The transducers P are in the preferred embodiment piezoelectric transducers, although other forms of transducers which convert electrical energy to mechanical motion may be used. For example, transducers using magnetostrictive effects may also be used. The electrical energy at the input terminals 22 is provided by an electrical signal source or sources E. The electrical signal source E may be any suitable oscillator or other waveform source of requisite frequency bandwidth, amplitude and desired characteristic.

The transducers P respond to the electrical signals furnished thereto from the signal source E by undergoing mechanical motion which is imparted as vibratory mechanical energy into the earth. The nature, type and intensity of motion of the transducers P is controlled by the signals applied to them by the electrical signal sources E.

The seismic source S further includes a second or upper plate member 24 mounted above the transducers P. The second plate member 24 is of a generally similar size and material as the plate member 12. Reinforcing or stiffener ribs may also be formed at suitable locations on either an upper surface 26 or a lower surface 28 of the second plate member 24. An earth clamp mechanism M is mounted with the second plate member 24 to anchor the seismic source S to the earth. The earth serves as a reaction mass to the vibratory energy imparted thereto from the piezoelectric transducers P because the earth clamping mechanism M anchors the second plate member 24 and consequently the transducers P and the first plate member 10 to the earth.

The earth clamping mechanism M of the seismic source S may take any of several suitable forms. For example, the earth clamping mechanism M may include an elongate rod 30 insertable into a borehole 32 drilled or otherwise suitably formed in the earth's surface at a suitable depth of a few feet. An anchor washer or disk 34 is threadedly mounted or otherwise suitably formed at the lower end 36 of the elongate rod 30. The anchor washer 34 is adapted to be engaged by and gripped by cement, soil or other fill material 38 placed into the borehole 32.

The elongate rod 30 extends upwardly through the passage 18 in the first plate member 12 and through an opening 40 formed in a central portion of the second or upper plate member 24. The elongate rod 30 has a connector C including a connector clamp 42 mounted along a threaded upper end 44. A locking nut 46 is typically also included above the connector clamp 42 to firmly lock the plate members 12 and 24, and consequently the seismic source S, to the earthen surface 10.

In a number of seismic survey situations, the earth's surface 10 may have a slope or otherwise not be perpendicular to the elongate rod 30. It is thus preferable, but not mandatory, to include a gimbal or pivot mechanism 48 between the connector C and the second plate member 24. The gimbal mechanism 48 may be of any suitable form permitting two degrees of freedom of movement with respect to the vertical longitudinal axis 20.

For example, a lower pivot plate or dish member 50 of the gimbal mechanism 48 is formed resting along its flat, lower surface 52 on the upper surface 26 of the second plate member 24. The dish member 50 includes a generally concave curved or spherical upper surface 54 adapted to receive a mating, correspondingly shaped convex curved or spherical lower surface 56 of a pivot nut or washer 58.

The dish member 50 has a central opening or passageway 60, while the pivot nut 58 has a similar central opening or passageway 62 for passage of the rod 30 therethrough. The openings 60 and 62 are generally larger than the rod 30 to permit relative movement of the dish member 50 and the pivot nut 52 with respect to the longitudinal axis 20. In this manner, plate members 12 and 24 are allowed to rest on a sloping or non-horizontal ground surface and yet permit effective coupling of the vibratory seismic energy from the transducers P into the earth.

The dish member 50 and the pivot nut 58 of the gimbal mechanism 48 also allow relative movement of the plate members 12 and 24 with respect to the vertical axis 20 due to sloping or irregular ground surface because of their mating curved or spherical surfaces 54 and 56, respectively. A connector disk or washer 64 and a lock nut 66 are inserted on the rod 30. The lock nut 66 is adapted to engage the threaded upper surface 44 of the rod 30 to hold the seismic source S at a desired position or angle on the earthen surface through the gimbal mechanism 48.

The earth clamping mechanism M may also take other forms than the elongate rod 30 and anchor washer For example, an alternate earth clamping mechanism M-1 in the form of a helically coiled screw member 70 may be used without requiring that a borehole 32 be drilled. The helically coiled screw member 70 has a pointed or barbed lower tip 72 for ease of mounting and insertion into the earthen surface. The coiled screw 70 also includes a coiled spiral body 74 and threaded upper end 76. The threaded upper end 76 is provided for connection with the locking nut 44 or the locking nut 64 as the case may be.

Figure 2:
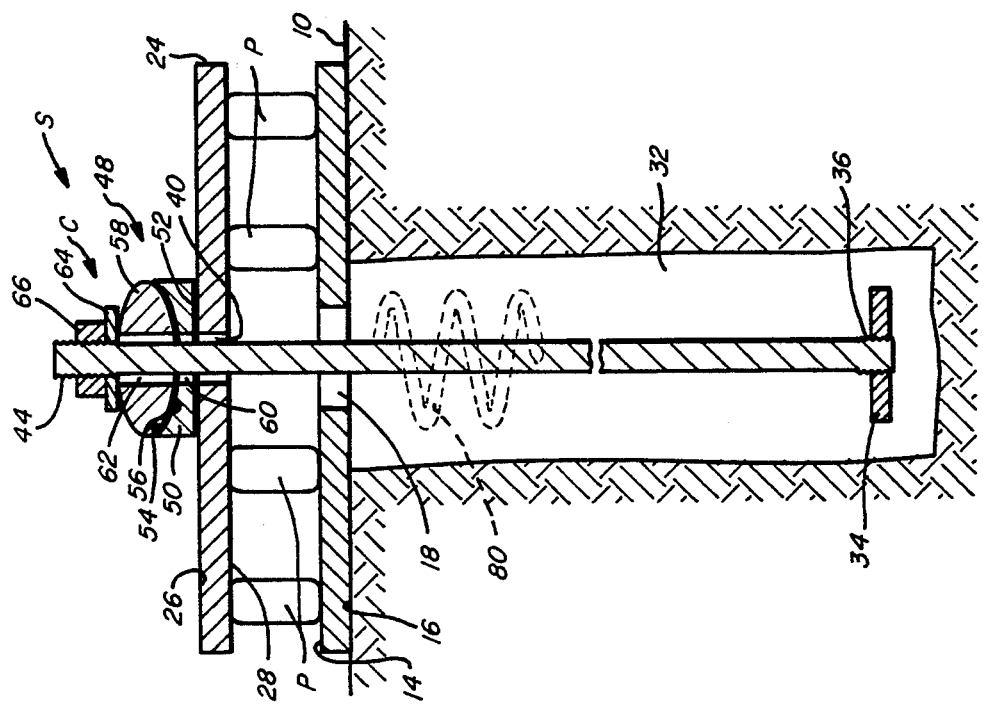
FIG. 2 is an elevation view, taken partly in cross-section, of another seismic energy source according to the present invention.
Figure 1:
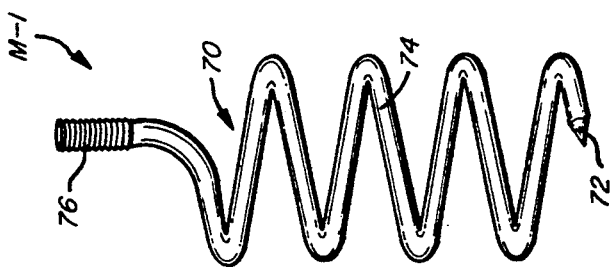
FIG. 1 is an elevation view, taken partly in cross-section, of a seismic energy source according to the present invention.

Another form of earth clamping mechanism which may be used is shown in phantom in FIG. 2. This alternate earth clamping mechanism is in the form of a spirally threaded helical auger or screw blade 80 which is adapted to be spirally threaded into earthen formations without requiring that a borehole 32 be drilled.

The earth clamping mechanism, whether the mechanism M in the form of the elongate rod 30 and anchor washer 34, the mechanism M-1 with the helically coiled screw 70, or the auger or screw blade 80 serve to anchor the second plate member 24 and consequently the seismic source S to the earth. Other equivalent forms of coupling and anchoring mechanism will occur to those skilled in the art.

In the operation of the present invention, the earth clamping mechanism M is located at a particular sourcepoint where it is desired that seismic energy be coupled into the earth for seismic purposes. Where the earth clamping mechanism is the mechanism M with elongate rod 30 and anchor member 34, a borehole 32 is formed and the anchor rod 30 and anchor washer 34 inserted. Fill material 38 of any suitable form is then used to fill the borehole 32 while insuring that the elongate rod 30 maintains a generally vertical position along its longitudinal axis 20. Where an earth clamping mechanism with the coil screw member 70 or auger blade 80 is used, it is not necessary to drill boreholes 32.

Once the earth clamping mechanism is anchored into the earth, the plate members 12 and 24 with the transducers P therebetween are inserted over the upper end of the elongate rod 30 and the first or lower plate member 12 lowered into contact with the surface 10 of the earth. The connector C and the gimbal mechanism 48 are then inserted over the upper end of the rod 30 and tightened down to anchor the second plate member 24 to the earth.

The seismic source S is then in position for transmission of vibratory mechanical energy into the earth for seismic survey purposes. Electrical energy from the electrical signal source E is conveyed to the piezoelectric transducers P. As the transducers P receive electrical energy, they undergo mechanical vibratory motion at an amplitude and frequency governed by the electrical signal provided from the signal source E.

The mechanical vibratory motion of the transducers P is imparted into the earth surface 10 through the first plate member 12. As has been set forth, the earth serves as a reaction mass to the vibratory energy because of the earth clamping mechanism anchoring the second plate member 24, and consequently the transducers P and the first plate member 12, to the earth.

The transducers P, whether piezoelectric or magnetostrictive, respond to the electrical energy from the electrical signal source E. The signal provided from the electrical source E can be controlled in both frequency, bandwidth and amplitude depending upon particular survey needs. The seismic signal source S of the present invention affords better signal control because the amount and type of mechanical vibratory movement of the transducers P may be controlled by controlling the electrical signals applied thereto from the electrical source E.

Further, the seismic source S according to the present invention is more portable and lightweight, since it is not necessary to reciprocate a large mechanical mass to create vibratory motion. The electrical energy provided to the transducers P serves as an alternate source of seismic energy. Further, the seismic source S according to the present invention allows a broader bandwidth of exploratory seismic signals. Typically, with mechanical oscillation used as the vibratory source of seismic energy in the prior art, eighty hertz was typically an upper limit of mechanical oscillatory movement.

With the seismic source S of the present invention and the piezoelectric transducers P, a broader bandwidth of seismic exploratory signal may be provided. Further, since the piezoelectric transducer crystals expand and exhibit mechanical deformation according to the electrical signal provided thereto, a reference bias or calibration point can be established. For example, a specified voltage level of input signal to the crystals can be used to establish a reference level of coupling force as an operating reference point for seismic exploration signals.

Additionally, if desired, a strain gauge or gauges may be mounted on one or more of the piezoelectric transducers P to monitor their displacement and movement in response to electrical signals provided thereto. Thus, a user of the seismic source S can therefore easily calibrate and monitor performance of the transducers P in the seismic source S.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A seismic energy source for imparting seismic energy into earth formations, comprising:
   a first plate member adapted to rest on an earthen surface;
   transducer means mounted on said first plate member for converting electrical energy into mechanical vibrating energy;
   a second plate member resting above said transducer means; and
   earth clamping means for anchoring said second plate member to the earth.

2. The seismic energy source of claim 1, wherein:
   said transducer means comprises piezoelectric transducer means.

3. The seismic energy source of claim 2, further including:
   an electric signal source for providing the electrical energy to said piezoelectric transducer means.

4. The seismic energy source of claim 3, wherein:
   said electric signal source comprises means providing a signal of controllable frequency and amplitude as the electrical energy to said piezoelectric transducer means.

5. The seismic energy source of claim 2, wherein:
   said piezoelectric transducer means comprises a plurality of piezoelectric transducers mounted on said first plate member.

6. The seismic energy source of claim 5, wherein:
   said plurality of piezoelectric transducers are symmetrically mounted about a vertical longitudinal axis.

7. The seismic energy source of claim 1, further including:
   means for connecting said earth clamping means to said second plate member.

8. The seismic energy source of claim 1, further including:
   means for adjusting the relative position of said earth clamping means and said second plate member to compensate for an uneven earthen surface.

9. The apparatus of claim 8, wherein:
   said means for adjusting comprises gimbal means connecting said earth clamping means to said second plate member.

10. The seismic energy source of claim 1, wherein:
    said earth clamping means comprises an earth engaging screw member.

11. The seismic energy source of claim 10, further including:
    means for connecting said screw member to said second plate member.

12. The seismic energy source of claim 1, wherein:
    said earth clamping means comprises an earth engaging auger member.

13. The seismic energy source of claim 12, further including:
    means for connecting said auger member to said second plate member.

14. The seismic energy source of claim 1, wherein:
    said earth clamping means comprises:
    an elongate rod insertable into a borehole formed in an earthen surface; and
    an anchor washer formed on said elongate rod.

15. The seismic energy source of claim 14, further including:
    means for connecting said elongate rod to said second plate member.

16. The seismic energy source of claim 1, wherein:
    said first plate member has an opening formed therethrough for passage of said earth clamping means.

17. The seismic energy source of claim 1, wherein:
    said second plate member has an opening formed therethrough for passage of said earth clamping means.

18. A seismic energy source for imparting seismic energy at fixed reference levels into earth formations, comprising:
    a first plate member adapted to rest on an earthen surface;
    transducer means for imparting vibratory motions into the earth at levels dependent on electrical energy provided thereto;
    means for providing electrical energy at a reference energy level to said transducer means;
    a second plate member resting above said transducer means; and
    earth clamping means for anchoring said second plate member to the earth.

19. The seismic energy source of claim 18, wherein said means for providing electrical energy comprises:
    an electric signal source for providing the electrical energy to said transducer means.

20. The seismic energy source of claim 19, wherein:
    said electric signal source comprises means providing a signal of controllable frequency and amplitude as the electrical energy to said transducer means.

* * * * *